United States Patent [19]

Fritsch et al.

[11] Patent Number: 4,546,929
[45] Date of Patent: Oct. 15, 1985

[54] ROTARY CUTTING TOOL, PARTICULARLY FOR COMMINUTING PLASTIC MATERIAL

[76] Inventors: Rudolf P. Fritsch, Goslarer Strasse 58, D-7000 Stuttgart 31; Hans Hench, Sonnenhalde 31, D-7851 Inzlingen, both of Fed. Rep. of Germany

[21] Appl. No.: 496,882

[22] Filed: May 23, 1983

[30] Foreign Application Priority Data

Jun. 4, 1982 [EP] European Pat. Off. ........ 82104898.0

[51] Int. Cl.[4] ........................................ B02C 18/18
[52] U.S. Cl. .................................................... 241/294
[58] Field of Search ............... 241/294, 293, 295, 191, 241/192

[56] References Cited

U.S. PATENT DOCUMENTS

| | | | |
|---|---|---|---|
| 1,947,440 | 2/1934 | Milne | 241/294 |
| 3,199,799 | 8/1965 | Sybertz | 241/294 |
| 3,865,164 | 2/1975 | Sybertz | 241/294 X |
| 4,360,168 | 11/1982 | Peterson, Jr. | 241/294 X |

FOREIGN PATENT DOCUMENTS

| | | |
|---|---|---|
| 2064212 | 7/1971 | Fed. Rep. of Germany . |
| 2917079 | 10/1980 | Fed. Rep. of Germany ...... 241/294 |
| 1456734 | 11/1976 | United Kingdom ............... 241/191 |

Primary Examiner—Mark Rosenbaum
Attorney, Agent, or Firm—Frishauf, Holtz, Goodman & Woodward

[57] ABSTRACT

An essentially cylindrical comminuting tool has axially extending cutter bars (8, 8a) having cutting edges (9) at the outer circumference thereof; the cutter bars are located in uniformly distributed position on the circumference of the tool and clamped therein by clamping elements (2, 2a) which are radially moved inwardly, to pull the cutter bars in tightly clamped position, by conical surfaces (18) formed on inwardly projecting portions (16) which engage with conical surfaces formed on clamping disks (19). The clamping disks (19) are drawn together by tension bolts (23). For simple assembly of the cutter bars, two clamping elements (2a) can be joined together into a U-shaped structure (FIG. 4), or all the clamping elements can be assembled in a ring-like structure (FIG. 5). The clamping elements preferably have angled, shallow V-shaped clamping surfaces (5a, 6a) which match similar clamping surfaces (5, 6) on the cutter bars.

20 Claims, 5 Drawing Figures

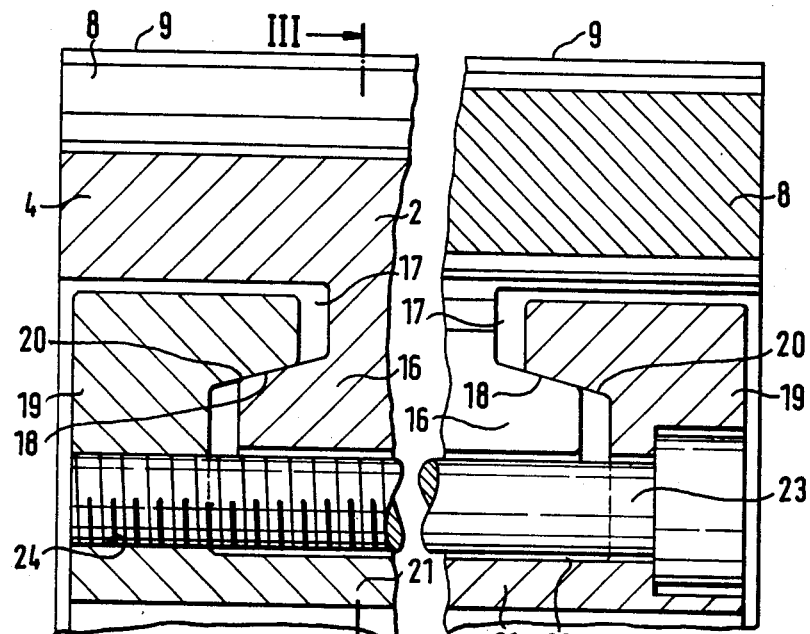
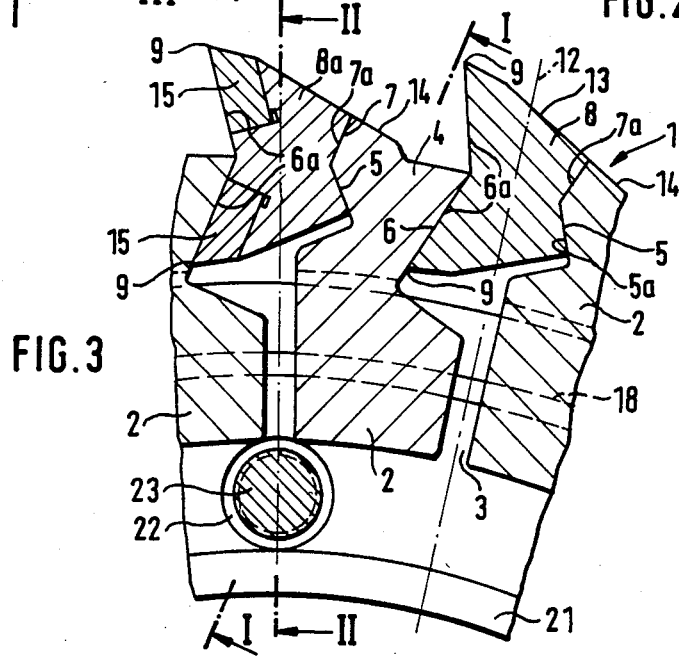

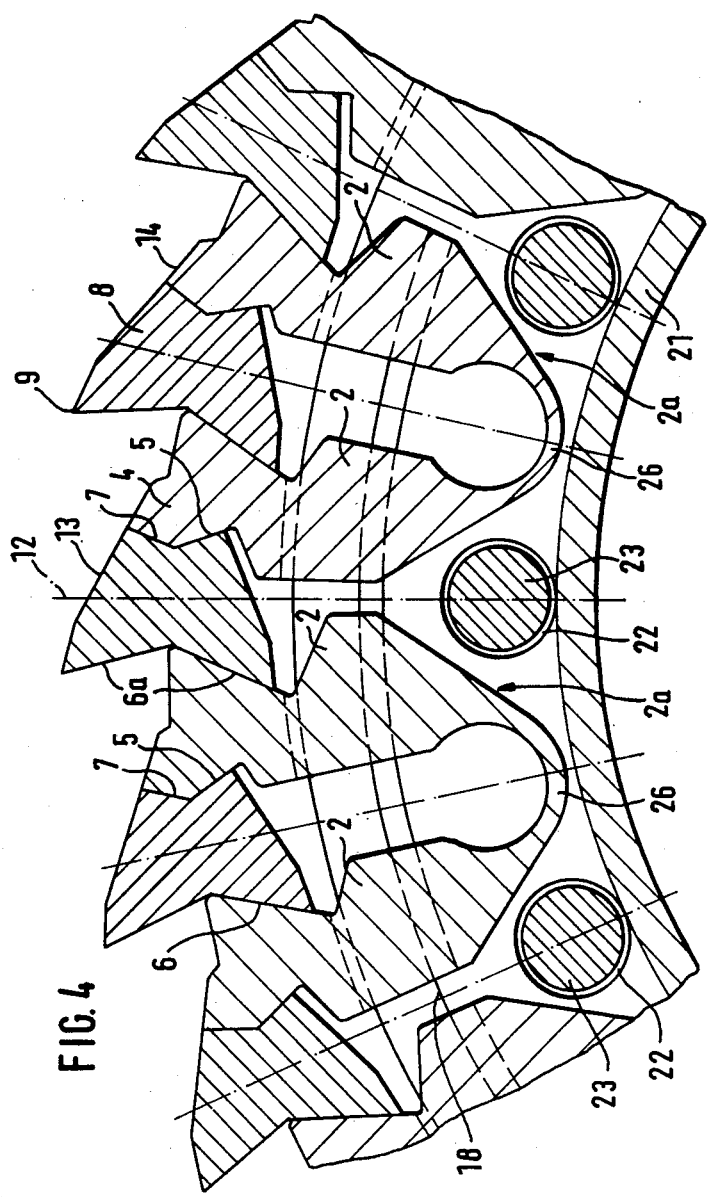

ROTARY CUTTING TOOL, PARTICULARLY FOR COMMINUTING PLASTIC MATERIAL

Reference to related disclosure: German Patent Disclosure Document DE-OS No. 20 64 212 corresponding to U.S. application Ser. No. 888,709, filed Dec. 29, 1969, KLINK et al, now U.S. Pat. No. 3,644,109.

The present invention relates to a rotary cutting tool, particularly for comminuting of plastic material, especially plastic fibers.

BACKGROUND

Comminuting tools, particularly tools which operate with rotary bodies, are subject to substantial wear. Such wear is particularly noticeable when cutting edges, cooperating with fixed anvil elements, are used to make comminuted or granulate elements from plastic material which contains a high degree of additives, for example plastic material which contains up to about 40% glass fibers, ceramic powder, or similar, pulverized material. The plastic may, for example, be of the nylon type, that is, a polyamide which contains the glass fiber or ceramic powder as a filler. It is possible also that one or more of the cutter blades become inoperative due to foreign material or due to the elements being comminuted, for example stray bits of metal, or the like.

Comminuting tools in accordance with known structures usually have single cutting blades which are soldered or brazed on a cutter body. Upon damage to the cutting elements, re-soldering or re-brazing of new cutters is complex, time and labor-intensive, and may result in a cutting element which is different from the original cutting unit which was subject to repair due to heat distortion upon re-brazing or re-soldering of new cutter blades. Additionally, the heat used in re-brazing one cutter blade may affect adjacent cutter blades, and their position as well adhesion and secure attachment to the base body, so that great care must be taken in repair of cutter units, for example by replacing a single cutting blade. The base bodies of which these tools are made are inherently expensive since originally cylindrical elements must be formed with precisely dimensioned grooves or recesses, by material removal. Repair of such tools is usually not possible by the user itself; it can be carried out ordinarily only in specific machine shops or installations particularly adapted to carrying out the required maintenance and repair.

The referenced German Patent Disclosure Document DE-OS No. 20 64 212, to which U.S. application Ser. No. 888,709 of Dec. 29, 1969 corresponds, describes a rotary cutting tool which permits exchange of defective cutting elements or cutting edge portions. This tool is designed for cutting and severing threads, yarns, and the like. The structure of the tool is complex, which, therefore, renders it expensive. This tool is so constructed that a massive tool base body has longitudinal grooves milled therein which tool body carries the axial pin or projection for connection to a rotary drive unit. The longitudinal grooves have cutter strips inserted therein which are retained in position by clamping disks located at axial end faces of the tool body. The clamping disks have a conical surface at their inner side which overlaps correspondingly inclined end portions of the cutter strips. Since the cutter strips are held in position only at their axial ends, the cutter strips must be manufactured with extremely accurate longitudinal tolerances since, otherwise, differential clamping forces will act on the respective individual cutter strips, or an elastic sealing and compensation washer or sleeves for the cutter strips must be provided at the axial ends. Such sealing sleeves at the ends limit the clamping force which can be applied on the cutter elements themselves, thus limiting the circumferential speed with which such a tool can operate. The manufacturing cost of such tool is high since the tool body as well as the clamping disks, and the additional slits which have to be provided for the cutter strips require extensive machining.

THE INVENTION

It is an object to provide a tool, particularly adapted for comminuting plastic elements, which is simple to construct, provides for easy exchangeability of cutter elements, and which clamps the respective cutter elements with precisely uniform clamping force, so that the tool can operate with high circumferential speed.

Briefly, a plurality of essentially part-segmental clamping elements are provided located for limited radial movement between adjacent cutter bars or strips, which are positioned axially along the circumference of an essentially cylindrical body. The clamping elements form, together with the cutter bars, an outwardly serrated circular cylindrical surface. The clamping elements have clamping portions, including engagement surfaces, which match similar engagement surfaces between which sequential cutting bars are clamped. The clamping elements, further, are formed with axially directed conical surfaces which are in engagement with matching conical surfaces of clamping elements, oriented for inward radial movement of the clamping elements upon being drawn together, for example by screws which are provided to tighten the cone surfaces of the clamping elements and the clamping disks, to thereby clamp the cutting bars on the body of the tool.

The radial clamp elements and the cutter elements can easily be made with high precision. Since the clamping conditions and forces for all the cutter elements are equal, that is, the same clamping forces are applied to all the clamping elements, the overall structure has excellent dynamic balance and low unbalanced circumferential or radial forces. This is particularly important to permit operation at high speed under low vibration conditions. The cutter elements are clamped over their entire axial length with high strength and high stability. The clamping and cutter elements can be provided at various radial positions depending on the diameter of the tool, so that tools with overall large diameter, example in the order of about 32 cm, may be constructed, the cutting conditions being essentially the same as those with tools of much smaller diameter.

It is possible to easily carry out experiments with a tool of this type by inserting cutting elements of different material. Since the cutter elements and the clamping elements all are, respectively, identical units, stocking of replacement or repair parts, or excess cutters for subsequent sharpening, is simple and requires a minimum of fixed investment.

The clamping forces are applied to the cutter elements uniformly over the clamping surfaces. Thus, there are no localized concentrations of clamping forces which result in differentially distributed, highly clamped spots which are spaced from each other. The clamping forces applied to the cutter elements are independent of their condition, and thus new or already partly used cutter elements will have the same clamping force applied thereto in relation to the axis of rotation of the cutter itself. Thus, replacement of cutter elements in a cutting tool permits easy matching of the overall circumferential diameter by grinding newly inserted cutter elements to a uniform external diameter. It is then only necessary to provide for little additional grinding of the overall tool to form a tool structure with uniform diameter at the outside of all the cutter elements. Upon such finish-grinding, which need remove only very little material, no change in the radial position of the base of the cutter elements will result.

The sector-formed clamping elements are, preferably, externally so shaped that they form a portion of the circumference of the tool element itself. They are centered by the clamping disks, by engagement with the conical surfaces. The invention is not limited to such a structure, however, since modifications may be made in which other means are provided to center the clamping elements, for example centering surfaces which match engagement surfaces of a hub.

The cutter or comminuting tool is used preferably for comminuting of plastic material. In order to prevent collection of stray plastic material on the tool itself, a completely closed surface should be provided thereon so that the material to be comminuted will not have the opportunity to collect in recesses or nooks of the tool. The closed outer circumference provided by the combination of the clamping elements and the cutter blades or strips provides such a closed surfaces which is particularly important when handling plastic remnants which have different colors; upon color change of the plastic material, no contamination of the comminuted material with a new color by a previous color will result since no surfaces for stray deposits of comminuted material are present on the comminuting tool.

The clamping disks can be attached directly on an operating shaft; alternatively, the clamping disks can be formed with suitable hubs for engagement with a shaft. Preferably, they are attached together by tension bolts extending parallel to the axis of rotation of the comminuting tool.

The cutter elements themselves can be unitary strips, rails or bars made, for example, of hardened chromium steel, cast stellite structures, or made of hard metal, such as tungsten carbide, or the like. Due to the uniform large-surface clamping forces applied to the cutter elements, it is also possible to use cutter elements made of ceramic, such as hard-ceramic compounds. The cutter elements may, of course, also be formed as hard metal strips which are soldered or brazed support or body structures.

The cutter elements can be applied to the support body either parallel to the axis thereof, at an inclination, or in a spiral path. Axially parallel cutter bars are easy to install and assemble.

DRAWINGS

FIG. 1 is a part-side, part-sectional view of the comminuting element, sectioned along line I—I of FIG. 3;

FIG. 2 is a sectional view of the comminuting element sectioned along line II—II of FIG. 3;

FIG. 3 is a fragmentary diametrical sectional view, sectioned along line III—III of FIG. 1;

FIG. 4 is a view similar to FIG. 3, illustrating another embodiment; and

DETAILED DESCRIPTION

Figure 5:
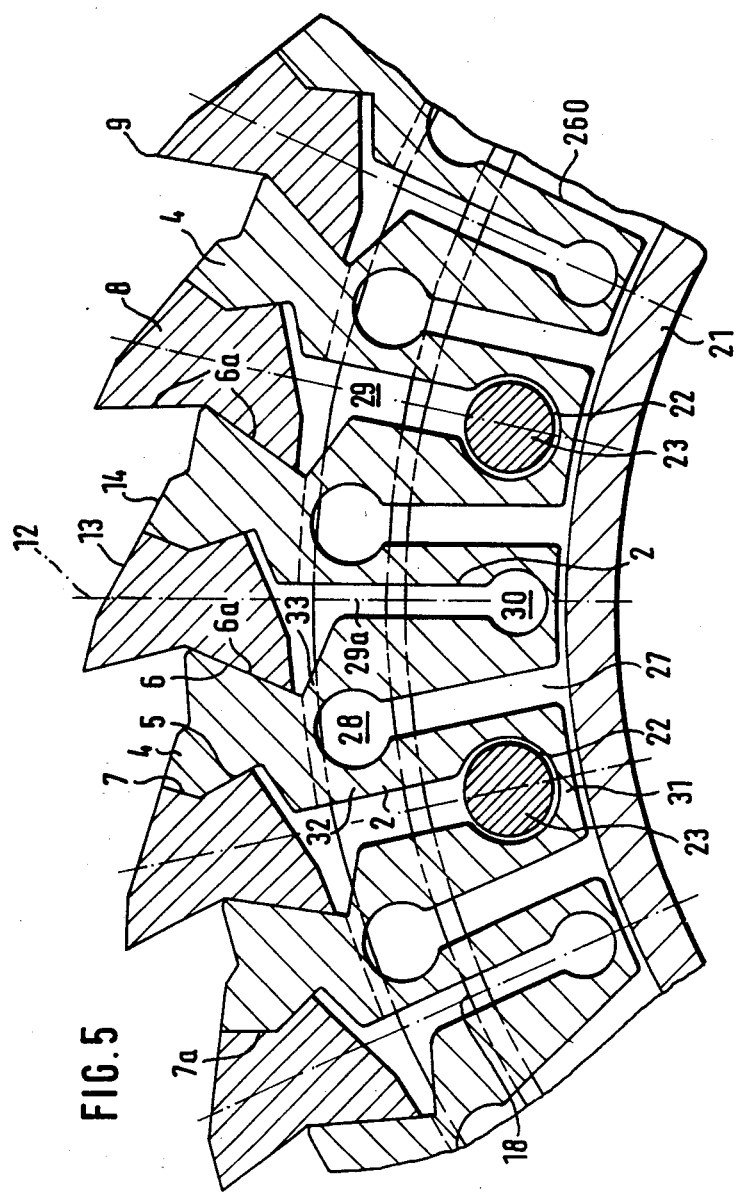
FIG. 5 is a view similar to FIG. 3, illustrating another embodiment.

The cutter illustrated in the respective Figures is primarily adapted for comminuting of thermoplastic man-made materials. By suitable shaping of the cutter geometry, it may also be used as a machining element for working on wood, metal, or plastic substances.

Embodiment of FIGS. 1-3: The tool is composed of a plurality of essentially sector-shaped clamping elements 2 which, together, form a circular structure. They are located, circumferentially—see FIGS. 3 and 4—adjacent each other such that a radial gap 3 is left between adjacent clamping elements 2.

Each one of the clamping elements 2 has, radially outwardly, a uniform, essentially wedge-shaped or triangular-shaped clamping portion 4, extending over the length of the tool 1. The clamping portion 4 has two respectively inclined clamping surfaces 5, 6 formed thereon. The clamping surface 5 merges into an abutment surface 7, radially outwardly of the clamping surface, which forms an obtuse angle with the clamping surface 5.

The clamping portion 4 of all the clamping elements 2 is located between two adjacent, essentially strip or rail or bar-like cutters 8, 8a—see FIG. 3—which extends axially over the length of the tool element 1, or at least of a major portion thereof. FIG. 3 illustrates two cutter elements 8, 8a, which can be positioned adjacent each other. Adjacent cutter elements need not be identical, but may be; the cutter elements 8 have an essentially X-shaped cross-sectional configuration and, each, have clamping surfaces 6a, 5a and an abutment surface 7a which are engaged by the associated clamping element 4 with the respective clamping surfaces 5, 6 and the abutment surface 7. The surfaces 6a and 5a, respectively, each are non-parallel and form a shallow V, in cross section, located with the apeces of the V facing each other—see FIG. 3. The cutter element 8 is an integral element with cutting edges 9 at the tips thereof. The cutting elements 8a have cutter inserts 15, for example hard metal strips, such as tungsten carbide, secured therein, for example by brazing. The cutter strips 15, likewise, are formed with the cutting edges 9.

The cutting edges 9 of the respective cutter elements 8, 8a comminute material engaged thereby. The radially projecting outer cutter edges 9 are all located on a common circle which is concentric with the axis of rotation of the tool. The cutter elements 8, 8a may extend parallel to the axis of rotation, or with an inclination thereto, or can be spirally twisted.

The clamping surfaces 5a, 6a of any one cutter element 8, 8a are located symmetrically with respect to a radial line 12 (FIG. 3) which intersects the axis of rotation of the tool. The outer surface of the tool is closed, as is readily apparent from FIG. 3, since the clamping elements 4 and the cutter elements 8 engage each other tightly, as shown. Thus, the outer surface does not permit accumulation of deposits of comminuted material in recesses thereof. The circumference of any one of the cutter elements 8, 8a matches closely, and merges into the respectively adjacent circumferential surface 14 of an adjacent clamping portion 4, without gap or seam. The circumferential surface 14 of the clamping portion 4, itself, engages in the V-notch of the subsequent engagement surface 6a of the next cutter element, so that, by merger of surfaces 13, 14—see FIG. 3—of the outer surfaces of the cutter elements and of the clamping elements, a continuous circumferential surface is obtained.

Cutter elements 8 are made throughout of a suitable wear-resistant cutting material, for example hardened chromium steel, fine-cast stellite, or hard metal throughout, or may be made of ceramic cutting material.

The cutter elements 8a usually includes a carrier structure made of steel in which, within the region of the cutter surfaces 6a, strips 15 of hard metal, such as tungsten carbide, which are sharpened at the edges 9 are inserted, for example by soldering or brazing.

Each one of the cutter elements 2 is formed at its end surface with an axially projecting clamping portion 16—see FIG. 1—which is located radially within the associated clamping portion 4 thereof. The clamping portion 4, and the interior axial projection 16, between them, define a ring-shaped groove or recess 17. The radially outwardly facing circumferential surface 18 of each one of the projecting elements 16 is conical, preferably slightly rounded conical, that is, slightly spherical—see particularly FIGS. 1 and 2. The spherical shape of the surfaces 18 is not readily visible in the drawings, since it is slight. Two clamping plates 19 are secured to the tool structure, which have inwardly projecting ring-shaped conical surfaces 20 thereon, matching and cooperating with the conical surfaces 18 of the projecting portions 16 of the respective clamping elements 2. The clamping disks 19 have a hub portion 21 formed thereon. The two hub portions 21 define a through-opening or bore to clamp the entire tool structure on a shaft, or the like, to rotate therewith, for example by frictional engagement, by means of a spline-and-groove connection (not shown) or the like.

The disks 19 are tightened against each other—see FIGS. 1 and 2—by tension bolts 23 which extend from a clamping disk 19 at one axial end to a facing clamping disk 19 at the other axial end, being screwed into suitably tapped openings, as seen at 24 in the facing clamping disk 19, see FIG. 1.

Use and Operation: Upon tightening the tension bolts 23—see FIGS. 1 and 2—the two clamping disks 19 are drawn towards each other in axial direction. The ring-shaped conical surfaces 20 thereof will press the conical surfaces 18 of the clamping elements 16 radially inwardly. This centers the clamping elements 2, while providing for radially inwardly directed tension thereon. Consequently, the cutter elements 8, 8a, respectively, are clamped between the wedge or conically shaped surfaces on the clamping portions 4 of the clamping elements 2.

The cutter elements 8, 8a, respectively, are radially positioned by the abutment surfaces 7 of the clamping portions 4 with respect to the clamping elements 2.

The cross-sectional shape of the cutter elements 8, 8a, respectively, is the same. Thus, the same clamping forces will be applied to all the cutter elements, so that a stable, uniform stress is applied over the entire axial length of the tool, loading the tool uniformly radially and axially, and providing stable uniform clamping and holding forces for the respective cutter elements 8, 8a.

Embodiment of FIG. 4: Basically, the clamping conditions for the respective cutter elements 8 are similar to those of FIGS. 1 to 3, and the same reference numerals have been used for similar elements operating similarly.

The difference between the structures of FIGS. 1-3 and FIG. 4 is the shape of the sector-shaped clamping elements 2. In FIGS. 1-3, the clamping elements 2 are separate single units, whereas, in the embodiment of FIG. 4, two clamping elements 2 are paired to form essentially U-shaped double-clamping elements 2a. The connecting region of the clamping elements is elastic and can bend resiliently. A comparatively thin connecting strip 26 is positioned between two stiff, rigid clamping elements 2 to form therewith the double-clamping element 2a. The clamping elements 2 themselves form the legs of the U-shaped elements 2a.

The arrangement of FIG. 4 has the advantage that only half as many clamping element units as those in FIGS. 1-3 have to be assembled together so that, upon assembly of the comminuting tool, the handling steps are reduced by about half.

Embodiment of FIG. 5: The clamping elements 2 are connected together into a uniform ring-shaped structure which has a radially elastic central portion 260, resiliently bendable, from which the clamping elements 2 project. The ring-shaped portion 260 has radially inwardly open slots 27 which terminate at their end portions in an enlarged, for example cylindrical opening or bore 28. A radially outwardly open slot 29, 29a, respectively, is located between adjacent slots 27, each one of the slots 29, 29a, respectively, terminating in enlarged, preferably cylindrical bores 22, 30. The bores 22 have a larger diameter than the bores 30 to receive the axially extending tension bolts 23 (FIGS. 2, 3). The radial slots 27, 29, 29a permit radially inward movement upon compression of the conical surfaces 18 and 20 on the projecting portions 16 of the clamping elements and the end disks 19. The radial slits 27, with the openings 28 therein, extend only up to about clamping portions 4. Yet, the ring can be radially inwardly compressed without causing or requiring plastic deformation of any one of the parts. The cross-sectional area or dimensions of the portions 31, 32, 33, which form the connecting portions of the circular structure, is small. The comparatively small cross section, permits tight clamping of the cutter elements 8 already with comparatively small forces applied by the conical surfaces 20 of the clamping disks 19 on the surfaces 18 of the clamping elements 2.

Assembly and disassembly of the comminuting cutter in the structure of FIG. 5 is particularly simple since handling of the respective clamping elements and insertion of the cutter elements 8, 8a, respectively, is simplified. Under unstressed conditions, that is, before tightening of the tension bolts 23, the respective cutter elements 8, 8a can easily be inserted into the spaces therefor by sliding them in axially, or snapping them in from the outside.

The clamping elements may be made by investment casting, or high-quality casting, so that the manufacture of the tool becomes economical. The cross section of the cutter elements 8, 8a, with their facing shallow V-notches, is roughly X-shaped, with an axis of symmetry connecting the apeces of the V-notches. Exchange of the cutting edges 9 thus becomes simple by merely reversing the cutter elements 8 end-for-end to then place a previously inwardly positioned cutting edge 9 at the outer circumference. Placing the engagement surfaces of any one of the cutter elements at an angle with respect to each other, that is, angling the surfaces 5, 6 with respect to each other while retaining the axis of symmetry with respect to a radius intersecting the axis of rotation of the tool, insures uniform clamping forces and clamping conditions on all engaging surfaces.

The conical clamping surfaces 18, 20 which, preferably, are slightly bulged or spherical with respect to each other, permit tight clamping, and spherical formation reduces the frictional forces which arise when the tension bolts 23 are tightened towards each other. This, therefore, is a preferred arrangement. The clamping surfaces 5, 6, 5a, 6a and the outer surfaces 13, 14 are identical in all the embodiments.

Various changes and modifications may be made, and features described in connection with any one of the embodiments may be used with any of the others, within the scope of the inventive concept.

We claim:

1. Rotary cutting tool, particularly for comminuting plastic material, defining an essentially cylindrical structure (1), said tool having
    a plurality of or strip-like cutting bars (8, 8a) located at the circumference of the structure at essentially uniform circumferential spacing, removably secured to the structure, and extending in axial direction over at least a portion of the structure;
    two facing axially positioned clamping disks (19) axially clamping the cutting bars to said structure,
    said tool comprising,
    a plurality of axially extending part-essentially segmental clamping elements (2, 2a) located for limited radial movement and positioned between the cutting bars (8, 8a) and forming, with the cutting bars, a serrated circular cylindrical surface,
    said clamping elements having clamping portions (4) including first and second clamping element engagement surfaces (5a, 6a) between which first and second matching cutting bar engagement surfaces (5, 6) of sequential cutting bars are clamped,
    said first and second engagement surfaces being non-parallel with respect to each other and forming an interlock between the clamping element engagement surfaces (5a, 6a) and the cutting bar engagement surfaces (5, 6);
    said clamping elements being formed with essentially conical surfaces at axial regions thereof;
    said clamping disks (19) being formed with coaxial conical surfaces (20) matching, and in engagement with the conical surfaces (18) of the clamping elements and oriented for inward radial movement of the clamping elements (2, 2a) upon mutual axial compression of the clamping disks towards each other;
    and means (23) for drawing the clamping disks (19) towards each other, hence causing radial inward movement of the clamping elements, and hence clamping of the cutting bars (8, 8a) between the clamping elements to define said serrated surface of said structure.

2. Tool according to claim 1, wherein the essentially cylindrical surface is defined by exterior surfaces of the sector-shaped clamping elements (2, 2a);
    and the clamping disks are concentrically—with respect to the axis of rotation of the tool—positioned, the conical surfaces thereof centering the clamping elements.

3. Tool according to claim 1, wherein the cutting bars (8, 8a) have outer surfaces (13);
    the clamping elements (2, 2a) are formed with outer surfaces (14), and the outer surfaces of the cutting bars and of the clamping elements (13, 14) are fitted essentially seamlessly against each other to form a continuous, closed outer circumference.

4. Tool according to claim 3, further including hub elements (21) formed on the clamping disks (19) to receive a shaft of the cutting tool.

5. Tool according to claim 1, wherein the means (23) for drawing the clamping disks towards each other comprises tension bolts (23) extending parallel to the axis of rotation of said tool.

6. Tool according to claim 1, wherein (FIG. 4) a connecting strip (26) is provided joined to two circumferentially adjacent clamping elements to join said adjacent clamping elements together into a double-clamping element (2a);
    and wherein said junction strip is resiliently bendable, the respective clamping elements of the double-clamping unit forming the legs of the U-shaped double-clamping unit.

7. Tool according to claim 1, wherein (FIG. 5) the clamping elements are connected together to form a single ring-shaped structure unit having radially projecting portions which form said clamping portions (4) including said engagement surfaces (5a, 6a) thereon, the unit being elastically bendable to elastically, yieldingly connect said clamping portions (4).

8. Tool according to claim 7, wherein the ring-shaped unit (260) has a radial slit (27) extending radially inwardly in the region of the respective clamping projections (4).

9. Tool according to claim 7, wherein said unit is formed with radially outwardly extending slots (29, 29a), open radially inwardly and located in the region of the unit between said clamping elements.

10. Tool according to claim 9, wherein the ring-shaped unit (260) has a radial slit (27) extending radially inwardly in the region of the respective clamping projections (4);
    the inwardly open slots (27) and the slots (29, 29a) between said inwardly open slots alternating with respect to each other.

11. Tool according to claim 1, wherein the cutting bars (8, 8a) are, in cross section, essentially X-shaped and include two cutting edges (9) located at symmetrically positioned terminal points of the X-shaped bars.

12. Tool according to claim 11, wherein the engagement surfaces (5a, 6a) of the cutting bars (8, 8a) are positioned symmetrically to a radius (12) intersecting the axis of rotation of the tool and extending at an acute angle with respect to said radius.

13. Tool according to claim 12, wherein the clamping surfaces (5a, 6a) of the cutter bars (8, 8a) forming said first and said engagement surfaces define, with respect to each other, a shallow V-configuration.

14. Tool according to claim 13, wherein the clamping elements (2, 2a) have axially directed inwardly projecting portions (16), said inwardly directed portions being formed with said essentially conical surfaces (18);
    and said clamping disks (19) have matching axially directed conical surfaces (20).

15. Tool according to claim 1, wherein the cutter bars (8a) comprise a cutter body and cutting edge portions (15) having cutting edges (9) thereon, secured to the cutter body.

16. Tool according to claim 1, wherein the cutter elements (8) comprise hard ceramic elements.

17. Tool according to claim 1, wherein the clamping elements (2, 2a) have axially directed inwardly projecting portions (16), said inwardly projecting portions being formed with said essentially conical surfaces (18);

and said clamping disks (19) have matching axially directed conical surfaces (20).

18. Tool according to claim 17, wherein at least one of the conical surfaces is slightly spherical or convex.

19. Tool according to claim 1, wherein the axial direction of the cutter bars is inclined with respect to the axis of rotation of the tool.

20. Tool according to claim 1, wherein the clamping elements are castings.

* * * * *